(12) United States Patent
Kranz et al.

(10) Patent No.: US 8,269,882 B2
(45) Date of Patent: Sep. 18, 2012

(54) DIAPHRAGM VALUE RECOGNITION

(75) Inventors: Gerhard Kranz, Wetzlar (DE); Oliver Zielberg, Wetzlar (DE); Ulrich Lies, Wetzlar (DE); Robert Denk, Braunfels (DE)

(73) Assignee: Leica Camera AG, Solms (DE)

( * ) Notice: Subject to any disclaimer, the term of this patent is extended or adjusted under 35 U.S.C. 154(b) by 756 days.

(21) Appl. No.: 12/441,256

(22) PCT Filed: Sep. 11, 2007

(86) PCT No.: PCT/DE2007/001634
§ 371 (c)(1),
(2), (4) Date: Mar. 13, 2009

(87) PCT Pub. No.: WO2008/031420
PCT Pub. Date: Mar. 20, 2008

(65) Prior Publication Data
US 2009/0256954 A1    Oct. 15, 2009

(30) Foreign Application Priority Data

Sep. 17, 2006   (DE) .................. 10 2006 044 309

(51) Int. Cl.
G03B 7/085  (2006.01)
H04N 5/238  (2006.01)

(52) U.S. Cl. ........................ 348/363; 396/257
(58) Field of Classification Search .................. 348/363; 396/234, 257
See application file for complete search history.

(56) References Cited

U.S. PATENT DOCUMENTS

| | | | |
|---|---|---|---|
| 3,672,271 A | | 6/1972 | Wagner et al. |
| 4,890,166 A | * | 12/1989 | Kimura et al. ............. 348/224.1 |
| 5,189,519 A | | 2/1993 | Miyamoto et al. |
| 5,440,368 A | * | 8/1995 | Momochi ....................... 396/157 |
| 5,659,813 A | * | 8/1997 | Kusaka et al. ................. 396/111 |
| 5,815,746 A | | 9/1998 | Masuda |
| 6,577,821 B2 | | 6/2003 | Desormeaux |
| 2001/0010762 A1 | | 8/2001 | Hirai et al. |
| 2003/0026610 A1 | | 2/2003 | Desormeaux |
| 2005/0074232 A1 | | 4/2005 | Nakata et al. |
| 2006/0147200 A1 | | 7/2006 | Arimoto et al. |
| 2006/0171697 A1 | | 8/2006 | Nojima |

FOREIGN PATENT DOCUMENTS

| | | |
|---|---|---|
| DE | 1 942 285 A1 | 3/1971 |
| DE | 602 07 496 T2 | 8/2006 |
| JP | 2-287225 A | 11/1990 |

* cited by examiner

Primary Examiner — Clayton E LaBalle
Assistant Examiner — Dennis Hancock
(74) Attorney, Agent, or Firm — Foley & Lardner LLP

(57) ABSTRACT

A method for determining the current camera aperture (working aperture) of lenses on digital cameras having a viewfinder eyepiece and internal exposure measurement through the lens is wherein a further external exposure measurement is carried out past the lens and the value of the working aperture is determined from a reference table stored in the digital camera from the difference $\Delta BV$ between the two measured exposure values $BV(int)$ and $BV(ext)$. A digital camera suitable for carrying out the method wherein outside the region covered by the lens tube, the housing of the digital camera has an additional window for a further exposure meter with an upstream optics that is directed onto the subject and serves to restrict the shooting angle, and includes a memory for a reference table for determining the aperture value.

8 Claims, 3 Drawing Sheets

| Measured at the luminance transmitter: | | calculated: | established: | | For detecting an aperture: |
|---|---|---|---|---|---|
| BV(ext) | BV(int) | ΔBV = BV(ext) - BV(int) | Value range for ΔBV (established) | | |
| | | | min. | max. | |
| 10 | 7,75 | 2,25 | 2,05 | 2,45 | 2 |
| 10 | 7,35 | 2,65 | 2,46 | 2,85 | 2,4 |
| 10 | 6,8 | 3,1 | 2,86 | 3,35 | 2,8 |
| 10 | 6,45 | 3,55 | 3,36 | 3,75 | 3,4 |
| 10 | 5,9 | 4,1 | 3,76 | 4,3 | 4 |
| 10 | 5,5 | 4,5 | 4,31 | 4,8 | 4,8 |
| 10 | 5 | 5 | 4,81 | 5,3 | 5,6 |
| 10 | 4,5 | 5,5 | 5,31 | 5,7 | 6,8 |
| 10 | 4 | 6 | 5,71 | 6,4 | 8 |
| 10 | 3,4 | 6,6 | 6,41 | 6,8 | 9,5 |
| 10 | 3 | 7 | 6,81 | 7,25 | 11 |
| 10 | 2,55 | 7,45 | 7,26 | 7,65 | 13 |
| 10 | 2,1 | 7,9 | 7,66 | 8,1 | 16 |

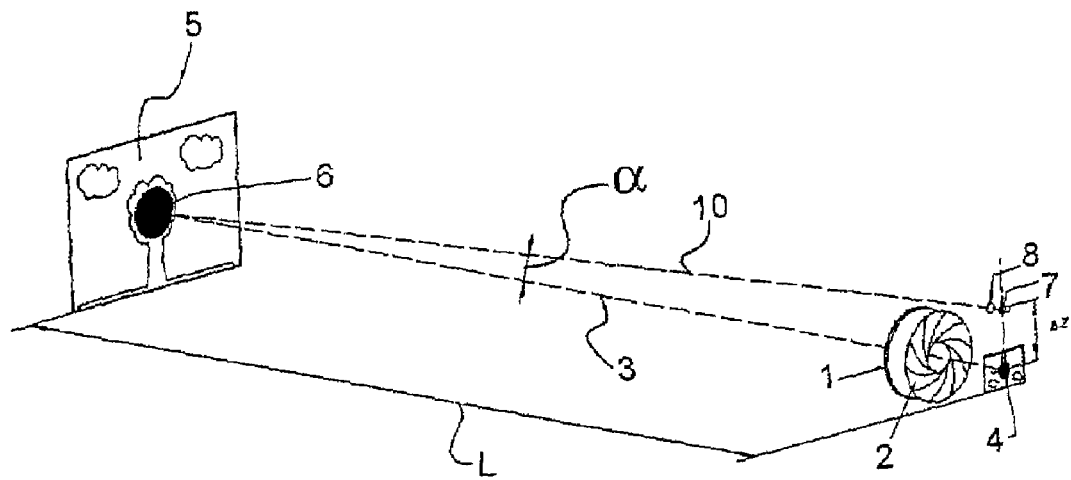
Fig. 3
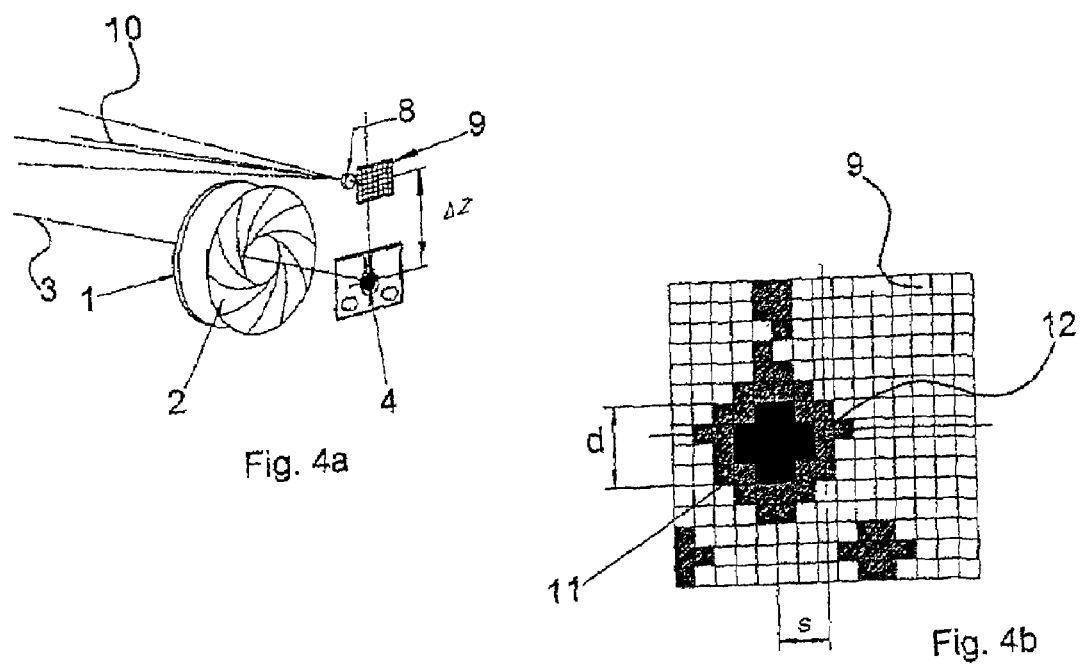
Fig. 4a
Fig. 4b
Fig. 4

DIAPHRAGM VALUE RECOGNITION

The invention relates to a method for determining the current camera aperture (working aperture) of lenses on digital cameras having a viewfinder eyepiece and internal exposure measurement through the lens, and to a digital camera suitable for carrying out the method.

BACKGROUND

For digitally shot images, it is possible for specific imaging errors and color drifts to be corrected subsequently with the aid of suitable software. Particularly with wide angle lenses, the image corners are displayed more darkly than the middle of the image because of vignetting. The correction of such an imaging error presupposes knowledge of the camera aperture (working aperture) used in shooting.

However, digital cameras with a viewfinder eyepiece and interchangeable lenses often have no electrical or mechanical aperture interface between lens and camera that could transmit the set aperture value to the camera electronics. Moreover, the position of the aperture in the lenses differs, thus producing differences between the set and effective aperture values. Furthermore, the angle steps for aperture setting are different, or not linear meaning that different effective aperture values are to be assigned to the possibly transmitted manipulated variable.

Knowledge of the set working aperture is also important for dimensioning the intensity of a measuring flash and the flash intensity for flash shots.

A geometric measurement of the camera aperture requires that an optical measuring element be positioned in the central beam path in the camera that enables a direction of view from the camera onto the rear side of the aperture. The optical element would need to be mounted on a swiveling lever, since it has to be removed from the beam path shortly before the photoexposure. Such arrangements are known in the case of exposure measurement arrangements through the lens for analogue cameras.

In order to determine the camera aperture, the image of the lens aperture could also be imaged onto a photosensitive line through a downstream optics by a mirror element on the swiveling lever. The photosensitive line and the optics for measuring the aperture diameter could be mounted in the floor of the camera. The number of illuminated cells on the photosensitive line is proportional to the aperture diameter. The condition of a symmetrical light distribution on the line can also be considered for the purpose of calculating the aperture value.

However, it is also conceivable to provide a semitransparent mirror on the swiveling lever and to arrange the sensor for exposure measurement downstream thereof. Such arrangements are known from analogue mirror reflex cameras and enable a high level of sensitivity in exposure measurement. The mechanical outlay on swiveling mirror structures is considerable. However, the size of the imaged camera aperture can be dependent on the subject to be shot when the structures thereof have the restriction of the aperture superposed on them and simulate a smaller aperture.

SUMMARY

It was therefore the object of the invention to specify a method and a digital camera suitable for carrying out the method that enable the effective aperture of the working aperture to be determined without complicated mechanics and independently of geometric shaping factors and the position of the working aperture in the lens.

In the case of a method of the type mentioned at the beginning, this object is achieved according to the invention by a further external exposure measurement past the lens and by determining the working aperture from the difference between the two measured exposure values. A digital camera suitable for carrying out the method has in the housing outside the area covered by the lens an additional window for a further exposure meter with an upstream imaging optics. Advantageous refinements of the method and of the digital camera follow from the features of the respective subclaims.

The invention proceeds from the finding that the conventional exposure measuring system inside the camera is not capable of determining the set aperture value without additional information. It has emerged surprisingly that the working aperture can be determined with adequate accuracy solely by means of a second exposure measurement that is independent of influences of the working aperture, by comparison with the measured value that measures the subject brightness as a function of the set working aperture.

It is possible with the aid of the inventive method to correctly determine the size of the respective working aperture when the acceptance angle range, referred to the subject, of the two exposure meters is absolutely equal, or when the subject is illuminated absolutely uniformly and has no clear differences in brightness. However, this ideal state does not occur as a rule, and so it is necessary to reckon with errors in the generation of the working aperture, but these can be minimized when taking account of the substantial negative influencing variables mentioned below.

Exposure meters of different design exhibit different sensitivities depending on the acceptance angle of the radiation. The intensity of the output signal as an integral over the entire acceptance angle range is therefore likewise dependent on the design of the exposure meter. In particular, strong, punctiform light sources in the subject can thus lead to different measurement results for exposure meters of different design. Consequently, identical acceptance angle curves must be ensured as far as possible in relation to the design and arrangement of the internal and external exposure meters.

The optical axes of the internal and external exposure meters are offset from one another. Depending on the adjustment of the external exposure meter and on the distance to the subject, this offset leads to a parallax error in the measurement result. The parallax error for the most frequent fields of application can be minimized by aligning the optical axis of the external exposure meter with a more medium shooting distance. An automatic parallax compensation can also be provided by coupling to the range setting on the lens.

The acceptance range of the internal exposure meter that is related to the subject is changed by interchangeable lenses or zoom lenses. For shooting lenses of longer focal length it becomes smaller, while for shooting lenses of shorter focal length it becomes larger.

By contrast, the acceptance range of the external exposure meter always remains the same. An adaptation to the focal length of the shooting lens can be performed by means of an adjustable optics upstream of the external exposure meter.

The measuring errors remaining in principle because of the characteristics of the exposure meters can be taken into account by reference measurements under standard conditions. Two measurements of the largest and smallest apertures of the working aperture are sufficient in principle for this purpose. The measured exposure values of the external and the internal exposure meters are shot in conjunction with a uniformly illuminated subject field with constant luminance.

When the external exposure meter sees the same luminance as the internal exposure meter, its measured value remains constant. The measured value of the internal exposure meter, by contrast, changes as a function of the set camera aperture. The differences between the two internal measured exposure values in relation to the external measured value are assigned to the opening of the largest and smallest working apertures and stored in a memory of the digital camera. Intermediate values of the working aperture can also be calculated by interpolating the measured difference values.

The light values measured by the external exposure meter in the practical application differ from the light value used in the reference measurement. Since the internally measured exposure values also change in the same ratio, however, the measured difference value remains the same. Should this not be the case, the externally measured exposure value can be normalized to the standard luminance, and the internally measured value can be brought to a comparable value by means of the normalization factor so that it is again possible to have recourse to the reference values.

Actually existing geometric aperture errors of the lens cannot be taken into account for the different aperture values when interpolating to intermediate aperture values. It is therefore advantageous to carry out the measurements in steps on a luminance standard, for example in half aperture values, and to store the differences between the measured exposure values in a table. In this case, it is possible to define in relation to each of the discrete difference values a symmetrical difference value range that does not overlap with a neighboring difference value range and to which an aperture value or intermediate aperture value is assigned from a normalized aperture range. Tolerances in the case of different interchangeable lenses can be compensated by the definition of the difference value ranges.

However, it is also possible that the difference value ranges assigned to the aperture values are not suitable for specific lens types. It is then expedient, for example, to determine dedicated reference tables for normal lenses, telephoto lenses or wide angle lenses, and to store them in a memory of the digital camera. It can likewise be expedient to classify the lenses in groups by other features such as, for example, the aperture range, and to store a separate reference table for each lens group or else for each lens.

The use of different reference tables is, however, sensible in the case of use of interchangeable lenses only whenever, after the insertion of the lens, the digital camera can automatically detect which lens type or which lens group is involved, or when the type or the group can be set manually.

When calibrating the external and internal exposure meters in order to compile the reference tables, a sufficiently large subject field is selected such that both the exposure meters are directed onto the same subject luminances. In the case of real subjects, the subject luminances for the external and the internal exposure measurements differ owing to different measurement angles.

In a preferred development of the inventive method, a correction of the determination of the aperture value performed before shooting can be carried out by evaluating a brightness distribution in the actual digital shooting. To this end, the brightnesses of subject parts in the image onto which the external and the internal exposure meters are really directed are compared with one another. The image section assigned to the internal exposure meter is the same for all lenses. The image section assigned to the external exposure meter is, by contrast, dependent on the focal length of the lens. The average brightnesses are calculated in relation to the respective image sections, and a correction value for the difference value taken from the reference table before the shot is determined therefrom after conversion into light values. This corrected difference value is then compared with the matching difference value range in the reference table, and the associated corrected value of the working aperture is taken therefrom.

Subdividing the image sections assigned to the respective exposure meters into as many subregions as desired also enables different acceptance angle ranges of the two exposure meters to be taken into account, and thus also enables higher contrasts in the assigned image section, such as punctiform light sources, for example, to be taken into account. Given knowledge of the range set, it is also possible in this way to take account of a parallax influence.

The external measured exposure value determined in addition in accordance with the invention can also advantageously be used to control the display brightness in the viewfinder of the digital camera.

The value of the working aperture taken from the reference table before shooting, or the interpolated value of the working aperture is preferably used to control the intensity of a measuring flash or shooting flash. A flash intensity adapted to the working aperture avoids failed attempts with an excessively low or excessively high flash intensity, and therefore also acts favorably on the energy consumption of the camera electronics.

The aperture value determined or corrected after shooting is, in any case, more accurate than the value calculated before shooting. It is therefore advantageously used to correct image data such as, for example, from vignetting, as a function of the lens or aperture.

A second exposure measurement independent of the working aperture set can also be performed in principle through the lens. However, it is possible to this end to make use only of a very narrow light beam along the optical axis of the lens. For the purpose of independence from the aperture set, the angle of aperture of the measuring beam should not be much greater than 1°. The size of the appropriate subject field can largely be determined freely via an intermediate image and can be adapted to the size of the primary measurement image for the internal exposure measurement. The beam path could correspond to that of the autofocus systems in the case of mirror reflex cameras.

The photosensor for the exposure measurement dependent on the working aperture would need to be arranged in an inclined manner on a swivel arm. A portion of the light is directed towards the bottom of the camera via a semimirrored surface of the photosensor. A field lens arranged in a conjugate image plane, and a, for example circular, aperture stop determine the angular aperture of the measuring beam for the second exposure measurement. A downstream optical system images a specific section of the subject onto a second photosensor that supplies a measured exposure value independent of aperture, and thus acts like an externally arranged exposure meter.

Such a system would have the advantage of a further exposure measurement free of parallax, and of an automatic adaptation of the measurement field in the event of any change of lens. However, in addition to the complicated mechanism for the swivel arm there is also the disadvantage of the photocurrents at the second photosensor being very low because of the small angular aperture.

Consequently, an additional external exposure meter is integrated in the camera for the requisite second light measurement at the subject, which does not influence the working aperture. This external exposure meter should thus be located most favorably in the cover cap in the vicinity of the lens.

Consideration should always only be given to only the selfsame object range from which the light falls onto the internal exposure meter. However, this is ideally possible only whenever the external exposure meter includes a parallax compensation and a variable optics. The reason why a variable optics is advantageous for the external exposure meter is that the size of the subject area imaged on the internal exposure meter through the lens depends on the lens focal length. The axes of the two exposure meters must meet at the center of the subject area from which the light flux is projected onto the internal exposure meter in order to compensate a parallax error. In any case, it has to be ensured in the case of the arrangement of the external exposure meter that the light flux it records experiences no vignetting by a lens housing.

The effect of the system for determining the working aperture is limited when use is made of optical filters upstream of the lens. Each filter upstream of the optics reduces the quantity of incident light. The internal exposure meter measures the incident light by taking account of the filter used, as the external exposure meter does not. Consequently, the difference between the two measured exposure values that are used to determine the aperture set increases. The consequence of this is that a smaller aperture value is taken from the reference table than has actually been used for the shooting. The compensation of the darker image corners would then be carried out with the aid of an incorrect vignetting curve of the lens. The fact that the vignetting becomes weaker for smaller aperture values and that the image corner correction thus turns out smaller means that the image corners are only slightly darker for the image result.

Structural conversion for an external exposure meter with automatic parallax compensation and variable optics is mechanically complicated and therefore cost-intensive. However, compromises can be made for reasons of cost. In a simplified design, the optics can be adjusted to a middle distance and to a fixed focal length. For deviant subject distances and focal lengths this would entail a measurement error that can, however, be corrected by the method, already described, of selected evaluation of the light values in the image shot when, however, an unacceptable worsening in image quality results because of incorrect flash illumination.

A variable optics and a mechanical parallax compensation upstream of the external exposure meter could also be omitted when the sensor surface of the external exposure meter is formed from a sufficiently large number of individual sensors in the form of a matrix sensor or line sensor. The size and position of the measurement field to be taken into account on the sensor surface are known for a known focal length of the lens in use and the range set at the lens. Only the individual sensors assigned to the measurement field are used for the exposure measurement.

Exemplary embodiments of the inventive method and an external exposure measurement arrangement, suitable for carrying out the method, in a digital camera are illustrated schematically in the drawing and will be described below. In the drawing:

BRIEF DESCRIPTION OF THE DRAWINGS

FIG. 3 shows the design principle for an internal and external exposure measurement, FIG. 4 shows an external exposure meter as matrix sensor.

DETAILED DESCRIPTION

Figures 1, 2:
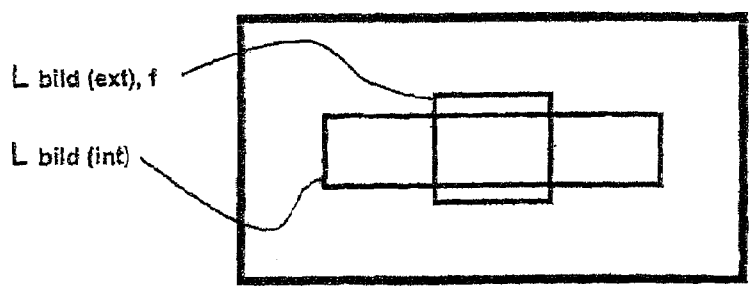
FIG. 1 shows a reference table.
FIG. 2 shows image sections for the internal and external exposure analysis.

FIG. 1 shows a reference table by way of example. Mounted upstream of a digital camera with a locked lens is a luminance transmitter with a sufficiently large, uniformly illuminated field. The digital camera includes an internal and an external exposure meter whose displayed values are adjusted to specific luminances. Because of the reference measurement through the lens, the lens errors and aperture errors, as well as the characteristics of the internal and external exposure meters are automatically also taken into account.

The reference measurement is carried out, for example, at a luminance that yields a measured exposure value BV10 given an aperture of 5.6. Thereafter, the exposure value BV(ext) displayed by the external exposure meter is kept constant at the adjustment value BV10. The size of the working aperture is varied in stepwise fashion over the available setting range, and the respective exposure value BV(int) is shot. Difference values ΔBV=BV(ext)−BV(int) are calculated therefrom. The individual steps are carried out, for example, in half aperture values of a normalized aperture range.

Established around the discrete difference values ΔBV are approximately symmetrical limit values that define a value range for ΔBV and are used to detect the set working aperture in the graduated normalized values. The value ranges are selected such that there is no overlapping of neighboring ranges. The determined reference table is stored in a memory of the camera electronics. If the digital camera has lens recognition, a dedicated reference table can be determined and stored for each lens.

Figure 5:
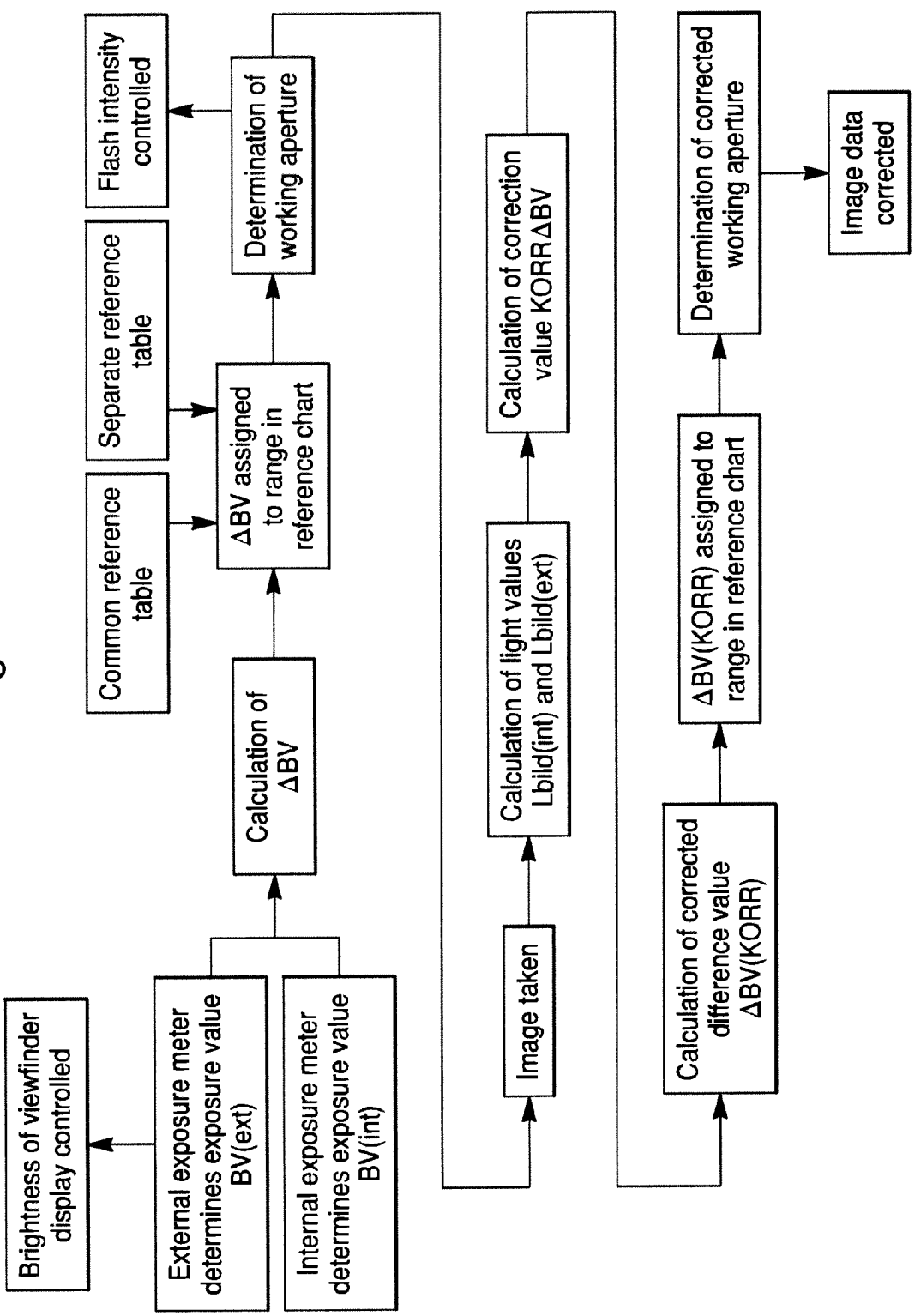
FIG. 5 shows a flow chart for determining a working aperture and a corrected value of the working aperture.

The flow chart of FIG. 5 illustrates the determination of a working aperture and a corrected value of the working aperture according to an exemplary embodiment. In advance of the individual shot, the external exposure meter determines the measured value BV(ext) which can, for example, also be used to control the brightness of a viewfinder display. The internal exposure meter determines the measured value BV(int). The difference value ABV=BV(ext)−BV(int) now corresponds to the current image situation with reference to lens, aperture and subject. This individual difference value ΔBV is assigned to the appropriate difference value range ΔBV(min−max), and the associated value of the working aperture is extracted therefrom. If, for example, a value of 9.65 is measured for BV(ext) and a value of 6.9 is measured for BV(int), the result is a ΔBV=2.75 and 2.4 as associated aperture value. This value, determined before the actual shot, of the working aperture can be used, for example, to establish the measuring flash intensity (guide number of the measuring flash).

The external and the internal exposure meters see the same subject luminances during calibration for the reference table. In the case of real subjects, the measured subject luminances of the external and the internal exposure meters differ owing to different measuring angles. It has emerged in this case as sensible to correct the aperture value determined before the shot by evaluating the brightness distributions in the actual digital shot.

To this end, it is possible to calculate the average brightness of the image section as seen by the internal exposure meter. This image section is the same for all lenses and yields a light value Lbild(int). Likewise, the average brightness of the image section as seen by the external exposure meter can be calculated. This image section is different for each lens focal length and therefore yields a light value Lbild(ext), f. A correction value KORRΔBV can be calculated as a corresponding measured exposure value from the two light values on the basis of the relationship KORRΔBV=(log(Lbild(ext),f/Lbild(int))/log 2 known per se. Instead of calculating the average brightnesses within the entire image section, the image sections can also be divided into segments for the purpose of individual brightness evaluation. It is thereby possible, for example, to take account individually of the effects of particularly intensive point light sources in the subject field.

The corrected difference value ΔBV(KORR)=ΔBV−KORRΔBV is then, in turn, to be assigned to the corresponding difference value range ΔBV(min−max), and the aperture value belonging thereto is to be extracted. If, for example, a value of 3.651 results for the brightness of the image section Lbild(int), and a value of 3.042 results for the brightness of the image section Lbild(ext), f, it follows that KORRΔBV 0.21 and ΔBV(KORR) is yielded as ΔBV(KORR)=2.75−(−0.26)=3.01 for the example already used above. A working aperture of 2.8 results as corrected value from the difference value range valid for this difference value.

Consequently, the aperture value determined or corrected after the shot is more accurate than the aperture value determined before the shot, and can therefore preferably be used to correct the image data, for example of the vignetting, as a function of the lens and aperture.

FIG. 2 shows an example of the different image sections that are seen by the internal and external exposure meters. In fact, the sensitivity distributions of the internal and external exposure meters fall off towards the edges, such that oval or circular image sections can also be selected for a more accurate weighting of the light values of the pixels.

FIG. 3 shows the design principle for an internal and external exposure analysis. A lens 1 with an aperture 2 is attached to a housing (not further illustrated) of a digital camera. Located on the optical axis 3 of the lens 1 in the interior of the camera is a measuring spot 4 for the internal exposure measurement. The measuring spot 4 can, for example, be arranged on the shutter curtain of the camera and reflect the measurement radiation onto an exposure meter arranged in the bottom of the camera. Such arrangements are known.

The objective 1 is intended to be used to shoot a subject 5 that is located at the distance L. The subject area 6 that is active for the internal exposure measurement corresponds in size to the measuring spot 4 projected through the lens 1 at the distance L.

An external exposure meter 7 is arranged downstream of a window in the cover cap of the digital camera, which is not illustrated in more detail. Arranged upstream of the exposure meter 7 is an optics 8 whose acceptance angle is not vignetted by the tube of the lens 1. In a simpler design, the exposure meter 7 can comprise a photoelectric receiver with a tubular light supply.

The external exposure meter 7 is arranged at the spacing Δz from the measuring spot 4 of the internal exposure meter. The optical axis 10 of the optics 8, and the tube axis of a light supply, are aligned at an angle α to the optical axis 3 of the lens 1 such that they intersect at the distance L in the center of the subject area 6. A parallax error in the measurement is excluded in this case. When the optics 8 has the same focal length as the lens 1, the external exposure meter sees the same subject area 6 for its measurement.

FIG. 4 shows, on an enlarged scale, the arrangement of the internal and external exposure meters, the external exposure meter being designed as a matrix sensor 9. The optical axis 10 of the optics 8 is arranged essentially parallel to the optical axis 3 of the lens 1. The position and the size of the subject area 6 imaged for the external exposure measurement are displaced on the matrix sensor 9 as a function of the subject distance set, and upon adaptation to the focal length of the lens 1. Given a known focal length of the lens 1, the size d of the sensor area 11 valid for the external exposure measurement can be determined by an evaluation electronics. The displacement s of the centroid of the sensor area 11 from the center 12 of the matrix sensor 9 is dependent on the distance setting of the lens 1. This can be determined by suitable sensors and then taken into account by an evaluation electronics.

It is an advantage of the system according to FIG. 4 that there is no need for mechanical parallax compensation, and that no compromise has to be selected for a medium distance setting. The outlay on adjustment is slight, since the reference parameters of the matrix sensor can be established by calibration. A disadvantage is that for long focal length lenses, the sensor region 11 for evaluation is small, and thus the measuring current is low.

| List of reference numerals | |
|---|---|
| 1 | Lens |
| 2 | Aperture |
| 3 | Optical axis of the lens |
| 4 | Measuring spot |
| 5 | Subject |
| 6 | Subject area |
| 7 | External exposure meter |
| 8 | Optics |
| 9 | Matrix sensor |
| 10 | Optical axis of the optics |
| 11 | Sensor area |
| 12 | Center of the matrix sensor |

The invention claimed is:

1. A method for determining the current camera aperture (working aperture) of lenses on a digital camera having a viewfinder and internal exposure measurement through the lens,
   wherein an external exposure measurement is carried out past the lens and the value of the working aperture is determined from a reference table stored in the digital camera from the difference between the internal and external measured exposure values, and
   wherein with reference to a constant externally measured exposure value, the reference table contains the respective differences of the measured exposure values for a working aperture varied in stepwise fashion, there being defined for each discrete difference value a difference value range that does not overlap with a neighboring difference value range, and each difference value range being assigned an aperture value from a normalized aperture range.

2. The method as claimed in claim 1, wherein a common reference table is compiled and stored in the digital camera for a group of lenses.

3. The method as claimed in claim 1, wherein a separate reference table is compiled and stored in the digital camera for each lens type.

4. The method as claimed in claim 1, wherein additionally the light values in a section assigned to a field of view of the internal and external exposure measurements, respectively, of the digitally shot image are determined and are used to correct the difference between the internal and external measured exposure values and thus to determine a corrected value of the working aperture.

5. The method as claimed in claim 4, wherein the corrected value of the working aperture is used to correct image data.

6. The method as claimed in claim 1, wherein the determined value of the external exposure measurement is used to control the brightness of an LED viewfinder display.

7. The method as claimed in claim 1, wherein the determined value of the working aperture is used to control a flash intensity.

8. A digital camera configured for carrying out the method as claimed in claim 1, further comprising the reference table.

* * * * *